United States Patent
Hung-Chung

(10) Patent No.: US 7,618,093 B2
(45) Date of Patent: Nov. 17, 2009

(54) SECURING MECHANISM OF THE BASE OF SAFETY CAR SEAT

(75) Inventor: Hou Hung-Chung, Chaiyi County (TW)

(73) Assignee: Link Treasure Limited, Tortola (VG)

( * ) Notice: Subject to any disclaimer, the term of this patent is extended or adjusted under 35 U.S.C. 154(b) by 304 days.

(21) Appl. No.: 11/499,708

(22) Filed: Aug. 7, 2006

(65) Prior Publication Data
US 2007/0040429 A1   Feb. 22, 2007

(30) Foreign Application Priority Data
Aug. 8, 2005  (TW) ................. 94213486 U

(51) Int. Cl.
A47C 1/08   (2006.01)
A47B 97/00   (2006.01)
(52) U.S. Cl. ............ 297/253; 297/254; 297/256.16
(58) Field of Classification Search ............ 297/238, 297/256.16, 253, 252, 254, 256.12, 463.1; 403/325, 49, 321, 322.1, 322.4; 24/629, 24/633, 636, 637
See application file for complete search history.

(56) References Cited

U.S. PATENT DOCUMENTS

| | | | |
|---|---|---|---|
| 5,466,044 A * | 11/1995 | Barley et al. | 297/252 |
| 5,487,588 A * | 1/1996 | Burleigh et al. | 297/253 |
| 6,082,819 A * | 7/2000 | Jackson | 297/253 |
| 6,209,957 B1 * | 4/2001 | Baloga et al. | 297/253 |
| 6,425,632 B1 * | 7/2002 | Anthony et al. | 297/250.1 |
| 6,561,724 B1 * | 5/2003 | Carletti | 403/315 |
| 6,820,310 B2 * | 11/2004 | Woodard et al. | 24/171 |
| 6,942,294 B2 * | 9/2005 | Takamizu | 297/256.16 |
| 6,962,394 B2 * | 11/2005 | Anthony et al. | 297/253 |
| 7,338,120 B2 * | 3/2008 | Gastaldi | 297/253 |

FOREIGN PATENT DOCUMENTS

EP   0646491 A1   4/1995
EP   1595736 A1   11/2005

* cited by examiner

Primary Examiner—David Dunn
Assistant Examiner—Erika Garrett
(74) Attorney, Agent, or Firm—Muncy, Geissler, Olds & Lowe, PLLC

(57) ABSTRACT

A securing mechanism of the base of safety car seat is provided to be connected to both sides of the rear end of the base of safety car seat to make the safety car seat secure at a joint provided on the car seat. The securing mechanism includes a snatching block, a releasing block, and a prop-up block wherein the snatching block is pivotally inserted in the joint at the car seat for limiting the base from separating from the joint. When it comes to releasing the securing mechanism, one can hold the releasing portion to move along the guided slot, thus push the releasing block to turn. Consequently, by making use of the resilience of the second resilient element, the prop-up end of the prop-up block is capable of pushing the joint out of the limiting portion making the securing mechanism separate from the joint of the car seat. Therefore, the securing mechanism is easy to operate and is capable of achieving the effect of being convenient in operation and having safety function.

8 Claims, 4 Drawing Sheets

SECURING MECHANISM OF THE BASE OF SAFETY CAR SEAT

FIELD OF THE INVENTION

The invention relates to a securing mechanism of the base of safety car seat, and more particularly, to a securing mechanism of the base of safety car seat installed on both sides of the rear end of the base for making the base secure or release from the car seat through the joint in coordination with the snatching action.

DESCRIPTION OF THE PRIOR ART

In the past, people tend to hold the baby and feel to be on the safe side if he/or she rides in a car. However, many experiments and reports on traffic accidents show that holding baby by adult in riding the car is even more dangerous since the baby become the safety air bag for the adult holding the baby.

Currently, many well-developed countries have set up the regulation that baby riding in a car has to use baby's safety car seat. However, placing the baby's safety car seat directly on the car seat is not stable and therefore not safe either. To be on the safe side, the baby's safety car seat has to be tied firmly by the seat belt in the car, and this is very inconvenient for the car rider. Thereafter, an improvement is done by making use of the safety belt to buckle up a base and let the baby's safety car seat secure directly on the base. On the contrary, when one intends to remove the baby's safety car seat from the car seat, one needs only to operate on the base to directly release the baby's safety car seat to avoid the trouble that one has to reach the back seat to operate the seat belt. However, if one utilizes only the safety belt to tie the base to the car seat, the baby's safety car seat will inevitably rock and sway on the car seat when the car comes across accelerating or braking action.

In view of this experience, some one begins to have the base of baby's safety car seat snap-lock to the joint provided on the car seat such as the mechanism provided by U.S. Pat. No. 6,082,819 only that its conveniency still needed to be improved.

SUMMARY OF THE INVENTION

In order to resolve the above-mentioned problems, the invention provides a securing mechanism of the base of safety car seat. The securing mechanism being connected to both sides of the rear end of the base of safety car seat to make the safety car seat secure at a joint at the car seat includes a snatching block, a releasing block, and a prop-up block wherein the snatching block is pivotally inserted in the joint at the car seat for limiting the base from separating from the joint.

When it comes to releasing the securing mechanism, one can hold the releasing portion to move along the guided slot, thus push the releasing block to turn. Consequently, by making use of the resilience of the second resilient element, the prop-up end of the prop-up block is capable of pushing the joint out of the limiting portion making the securing mechanism separate from the joint of the car seat. Therefore, the securing mechanism is easy to operate and is capable of achieving the effect of being convenient in operation and having safety function.

The accomplishment of this and other objectives and the range of suitability of the application of the invention will become apparent from the following description and its accompanying drawings of which:

DETAILED DESCRIPTION OF THE PREFERRED EMBODIMENT

Figure 1:
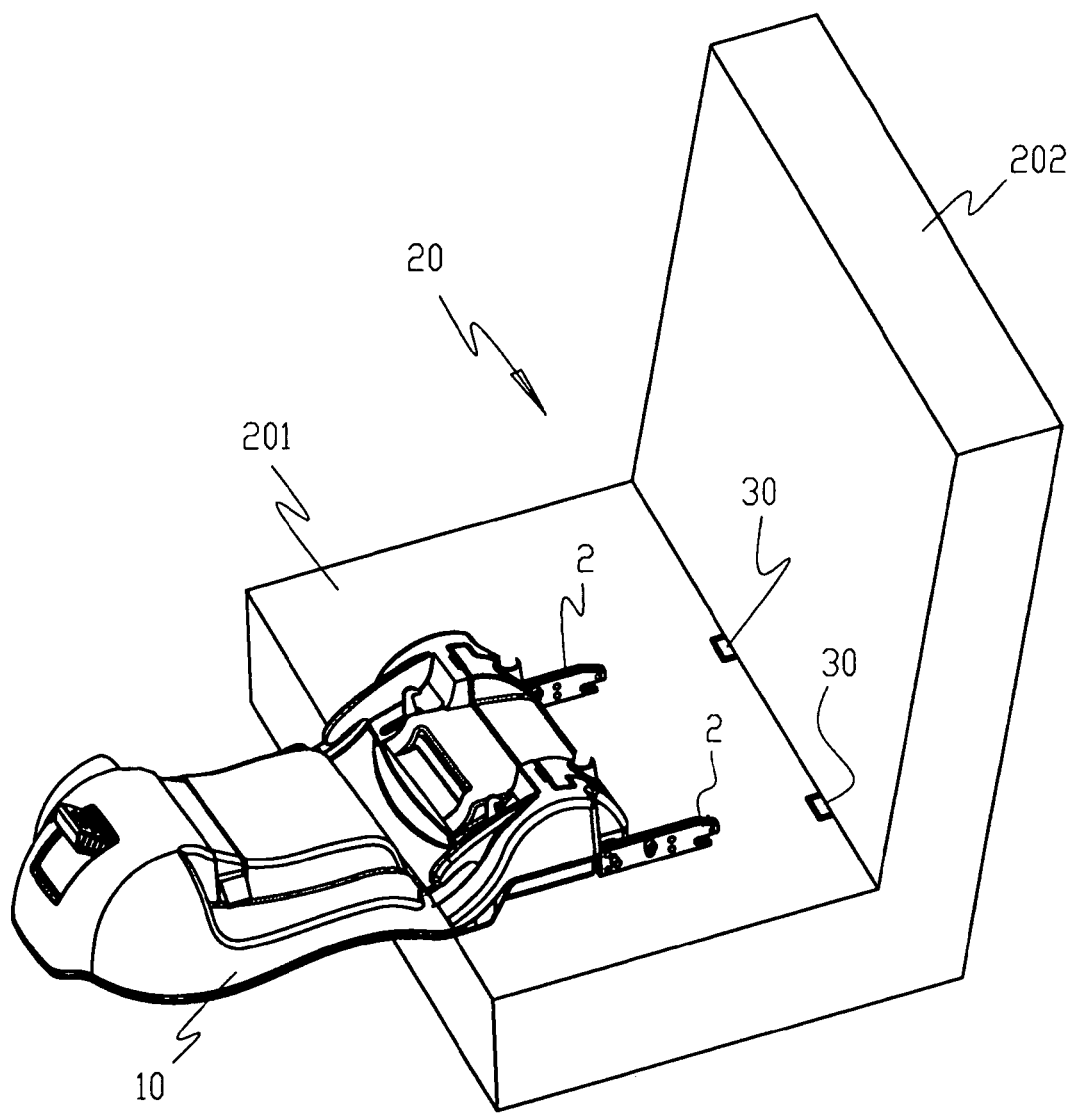
FIG. 1 is a schematic and isometric view of the invention showing the assembled diagram of the securing mechanism and the car seat.

FIG. 1 is a schematic and isometric view of the invention showing the assembled diagram of the securing mechanism and the car seat. What is shown in FIG. 1 is an embodiment of the securing mechanism of the base of safety car seat. The function of the securing mechanism is to facilitate the operator to secure a baby's car-safety-seat on the car seat (20). The joint (30) installed between the seat portion (201) and the backrest portion (202) in the general facility of a car nowadays can be employed for the securing mechanism of the invention. As shown in FIG. 1, the embodiment of the securing mechanism (2) of the base of safety car seat includes a base (10) and a securing mechanism (2).

Figure 2:
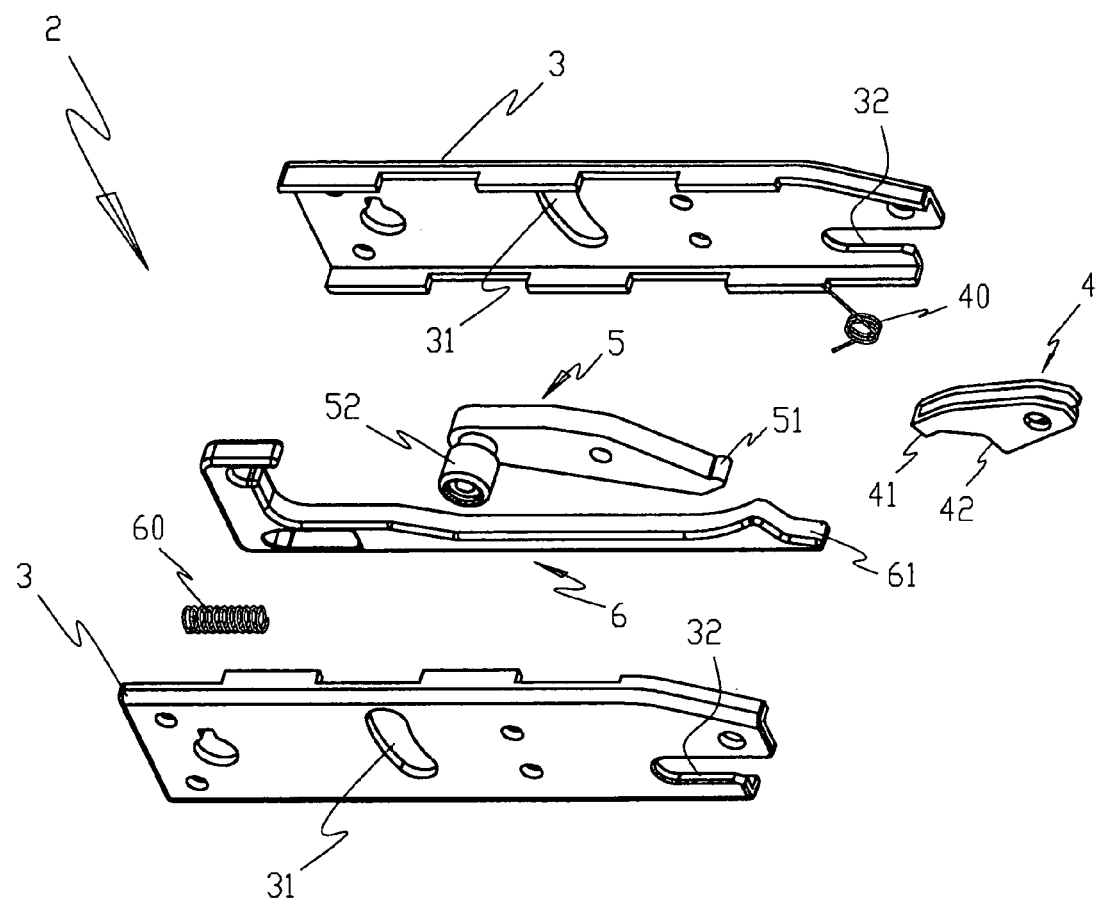
FIG. 2 is a schematic and exploded view of the members of the securing mechanism of the invention.
Figure 3:
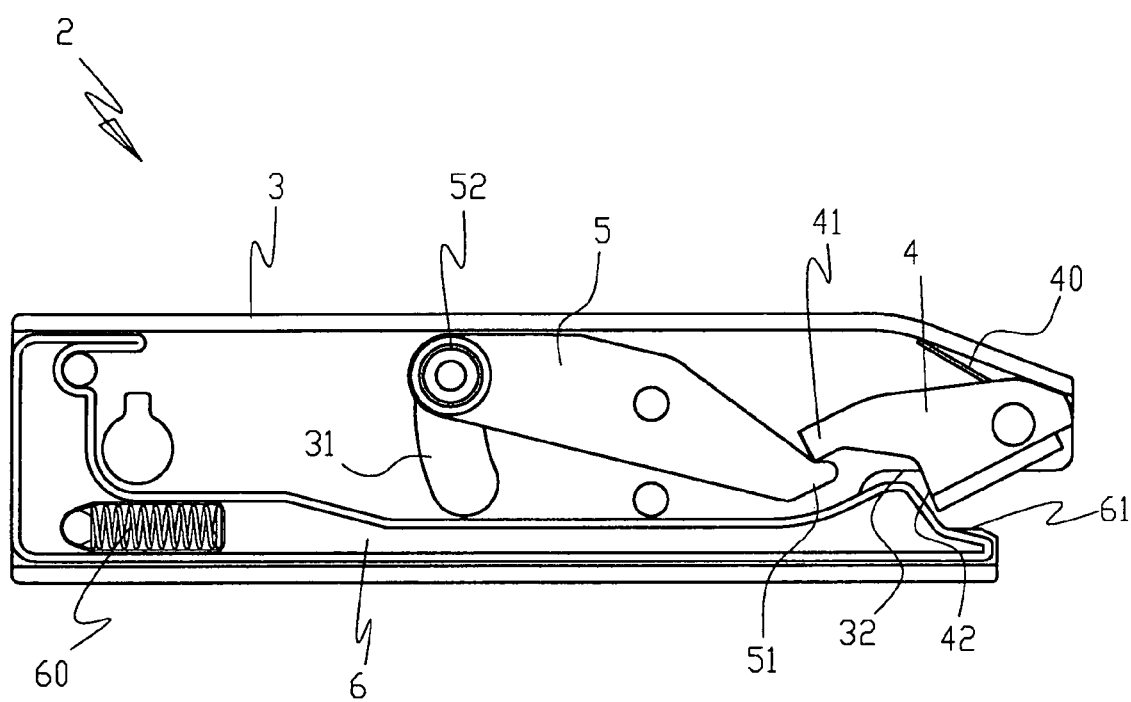
FIG. 3 is a schematic see-through diagram of the securing mechanism of the invention.

The base (10) is capable of installing on the car seat (20) for providing the operator with the function of securing and releasing the baby's car-safety-seat. FIG. 2 is a schematic and exploded view of the members of the securing mechanism of the invention; while FIG. 3 is a schematic see-through diagram of the securing mechanism of the invention. As shown in FIG. 2 and FIG. 3, the securing mechanism (2) being installed on both sides of the rear end of the base (10) includes a body (3), a snatching block (4), a releasing block (5), and a prop-up block (6).

In the present embodiment, the body (3) is a two-piece type assembly with an end that is fixed or can be disassembled, and is connected to both sides of the rear end while the other end has a receiving slot (32) for receiving the entering of the joint (30). Besides, a guided slot (31) is also provided at the midsection of the body (3).

The snatching block (4) being pivotally connected to the body (3) at a pivot where a first resilient element (40) is installed between the snatching block (4) and the body (3) includes a follower portion (41) and a limiting portion (42). In the present embodiment, the first resilient element (40) can be a torsion spring. Under normal condition, by making use of the resilience of the torsion spring, one is capable of making the limiting portion (42) of the snatching block (4) engage with the joint (30) to protect the securing mechanism from releasing from the joint (30).

The releasing block (5) having its mid-section pivotally connected to the body (3) has a driving end (51) at an end of the releasing block (5) and has a releasing portion (52) at the other end which is either transversely connected thereto or extended therefrom. Under normal condition, the driving end (51) is positioned under the follower portion (41) and is pressed against by the follower portion (41) of the snatching block (4). The releasing portion (52) being protruded out of the body (3) through the guided slot (31) is for providing the operator with the action of driving the releasing block (5) to turn.

The prop-up block (6) having an end form a prop-up end (61) and having a second resilient element (60) installed between the prop-up block (6) itself and the body (3) is installed in the body (3) such that the prop-up block (6) itself is capable of linearly sliding in the body (3). In the present embodiment, the second resilient element (60) can be a compression spring. By making use of resilience of the compression spring, one is capable of making the snatching block (4) engage with the joint (30) appearing a compressing state.

Figure 4:
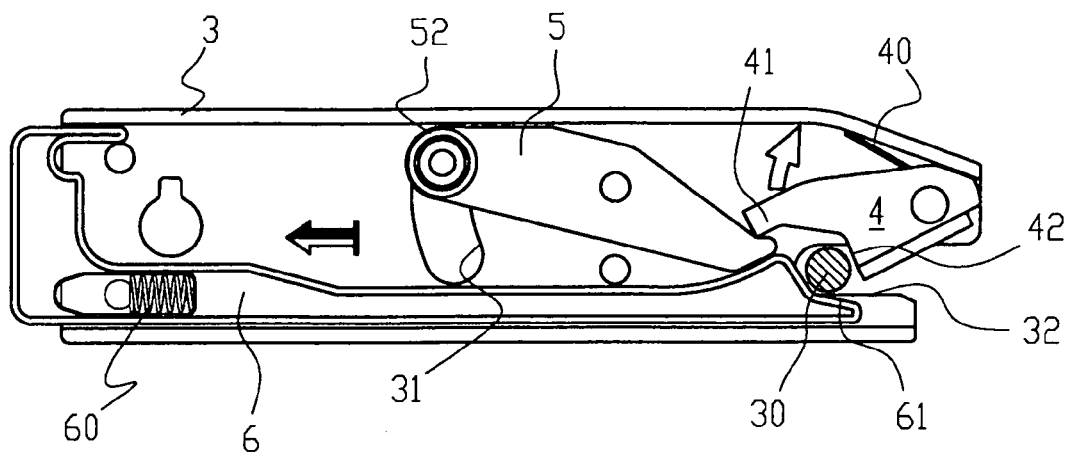
FIG. 4 is a schematic diagram showing the snatching action between the securing mechanism and the joint of the invention.
Figure 5:
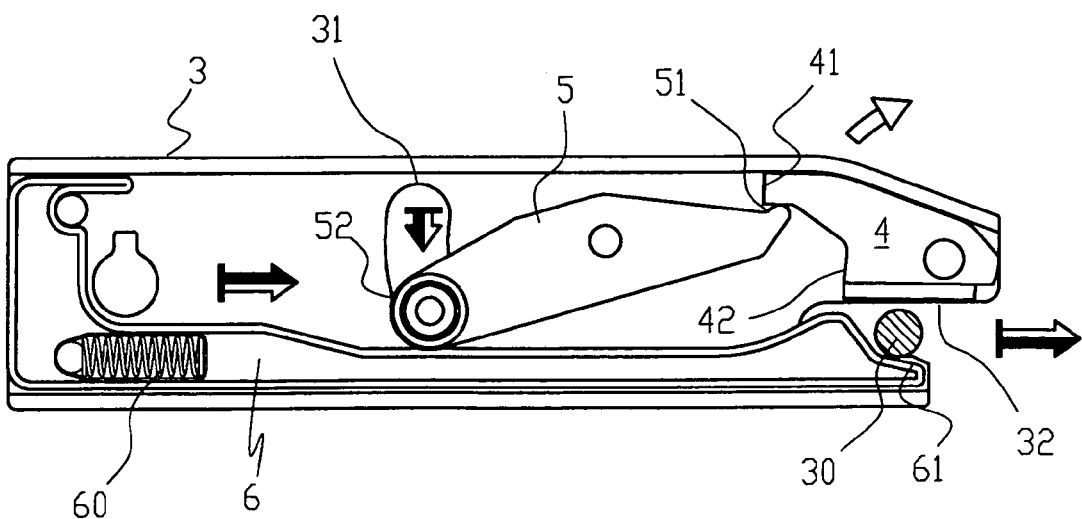
FIG. 5 is a schematic diagram showing the releasing action between the securing mechanism and the joint of the invention.

FIG. 4 is a schematic diagram showing the snatching action between the securing mechanism and the joint of the invention while FIG. 5 is a schematic diagram showing the releasing action between the securing mechanism and the joint of the invention.

As shown in FIG. 4 and FIG. 5, through the foregoing assembly, as one desires to have the securing mechanism (2) engage with the joint (30) on the car seat (20), the joint (30) is capable of driving the snatching block (4) to turn and making the joint (30) enter the limiting portion (42) of the snatching block (4) to appear a securing state. In the meantime, the joint (30) pushes the prop-up block (6) to compress the second resilient element (60) appearing a compressing state.

While the operator intends to release the securing mechanism (2), he/or she can hold the releasing portion (52) to move along the guided slot (31), thus push the releasing block (5) to turn. Consequently, since the releasing block (5) is positioned beneath the follower portion (41) of the snatching block (4), the turning of the releasing block (5) is capable of making the driving end (51) drive the follower portion (41) to turn the snatching block (4). At this moment, by making use of the resilience of the second resilient element (60), the prop-up end (61) of the prop-up block (6) is capable of pushing the joint (30) out of the limiting portion (42) making the securing mechanism (2) separate from the joint (30) of the car seat (20). Therefore, the securing mechanism (2) is easy to operate and is capable of achieving the effect of being convenient in operation and having safety function.

It will become apparent to those people skilled in the art that various modifications and variations can be made to the mechanism of the invention without departing from the scope or spirit of the invention. In view of the foregoing description, it is intended that all the modifications and variation fall within the scope of the following appended claims and their equivalents.

What is claimed is:

1. A securing mechanism of the base of safety car seat, being connected to both sides of the rear end of the base of safety car seat to make the safety car seat secure at a joint provided at the car seat, the securing mechanism comprising:
    a body connected to both sides of the rear end of the base and having a guide slot;
    a snatching block together with a first resilient element being pivotally connected to the body and having a limiting portion for limiting the release of the securing mechanism from the joint;
    a releasing block being pivotally connected to the body for propping up the snatching block to release the joint; and
    a prop-up block slidably connected to the body, the securing mechanism being installed on the car seat by using a second resilient element, the prop-up block subjects the joint to be held by the limiting portion; and upon release of the securing mechanism, a releasing portion moves along the guide slot, thus pushing the releasing block to turn, consequently, by resilience of the second resilient element, the prop-up end of the prop-up block pushes the joint out of the limiting portion making the securing mechanism separate from the joint of the car seat.

2. The securing mechanism of the base of safety car seat as claimed in claim 1, wherein the body has a receiving slot provided at an end thereof for receiving the joint, and the guide slot is also provided at the mid-section of the body for guiding the releasing block.

3. The securing mechanism of the base of safety car seat as claimed in claim 1, wherein said releasing portion that is salient and extended transversely from the guide slot is provided at an end of the releasing block.

4. The securing mechanism of the base of safety car seat as claimed in claim 3, wherein the other end of the releasing block forms a driving end that is positioned below the snatching block.

5. The securing mechanism of the base of safety car seat as claimed in claim 1, wherein the first resilient element is a torsion spring.

6. The securing mechanism of the base of safety car seat as claimed in claim 1, wherein the second resilient element is a compression spring.

7. The securing mechanism of the base of safety car seat as claimed in claim 6, wherein the compression spring is in compressing state when the securing mechanism is secured at the joint.

8. The securing mechanism of the base of safety car seat as claimed in claim 1, wherein the prop-up block is pushable by the joint to perform a linear sliding motion.

* * * * *